United States Patent [19]

Katayama et al.

[11] Patent Number: 4,924,983

[45] Date of Patent: May 15, 1990

[54] PROPELLING CLUTCH APPARATUS FOR A WORKING VEHICLE

[75] Inventors: Yoshiyuki Katayama; Takeshi Ura; Akio Inamori, all of Sakai, Japan

[73] Assignee: Kubota, Ltd., Osaka, Japan

[21] Appl. No.: 280,690

[22] Filed: Dec. 6, 1988

[30] Foreign Application Priority Data

| Dec. 10, 1987 | [JP] | Japan | 62-313657 |
| Dec. 11, 1987 | [JP] | Japan | 62-314859 |
| Dec. 11, 1987 | [JP] | Japan | 62-314860 |
| Dec. 11, 1987 | [JP] | Japan | 62-314864 |

[51] Int. Cl.$^5$ .......................................... F16D 11/06
[52] U.S. Cl. ................................. 192/52; 192/87.15; 192/103 F; 192/109 F
[58] Field of Search ............ 192/51, 52, 87.12, 87.15, 192/87.13, 87.19, 103 C, 103 R, 109 R; 73/511

[56] References Cited

U.S. PATENT DOCUMENTS

| 3,649,083 | 3/1972 | Depenheuer | 73/511 X |
| 3,938,631 | 2/1976 | Smith | 192/87.12 X |
| 3,990,553 | 11/1976 | Holzinger et al. | 192/109 F X |
| 4,057,132 | 11/1977 | Hatton et al. | 192/87.12 X |
| 4,676,349 | 6/1987 | Coutant | 192/87.13 X |

FOREIGN PATENT DOCUMENTS

| 59-110923 | 6/1984 | Japan . |
| 61-136044 | 6/1986 | Japan . |
| 62-231841 | 10/1987 | Japan . |
| 678430 | 8/1979 | U.S.S.R. | 73/511 |

Primary Examiner—Randolph A. Reese
Assistant Examiner—Arlen L. Olsen
Attorney, Agent, or Firm—Webb, Burden, Ziesenheim & Webb

[57] ABSTRACT

A propelling clutch apparatus for a working vehicle comprises a friction type hydraulic clutch mounted on a propelling line, a valve for adjusting an oil pressure applied to the hydraulic clutch, a sensor for detecting angular acceleration of a rotary shaft included in the propelling line, and a control unit for controlling the hydraulic clutch in response to a change in a vehicle running state. The control unit effects controls in three stages. The first stage includes a preliminary step of narrowing spaces between friction disks of the hydraulic clutch by applying the oil pressure at a maximum level to the hydraulic clutch for a predetermined time from receipt of a clutch engaging command, and a subsequent main step of applying the oil pressure with predetermined characteristics. The second stage is for maintaining the hydraulic clutch in a half-clutch state when the angular acceleration in an accelerating direction or a decelerating direction reaches a predetermined value. The third stage is for fully engaging the hydraulic clutch.

15 Claims, 14 Drawing Sheets

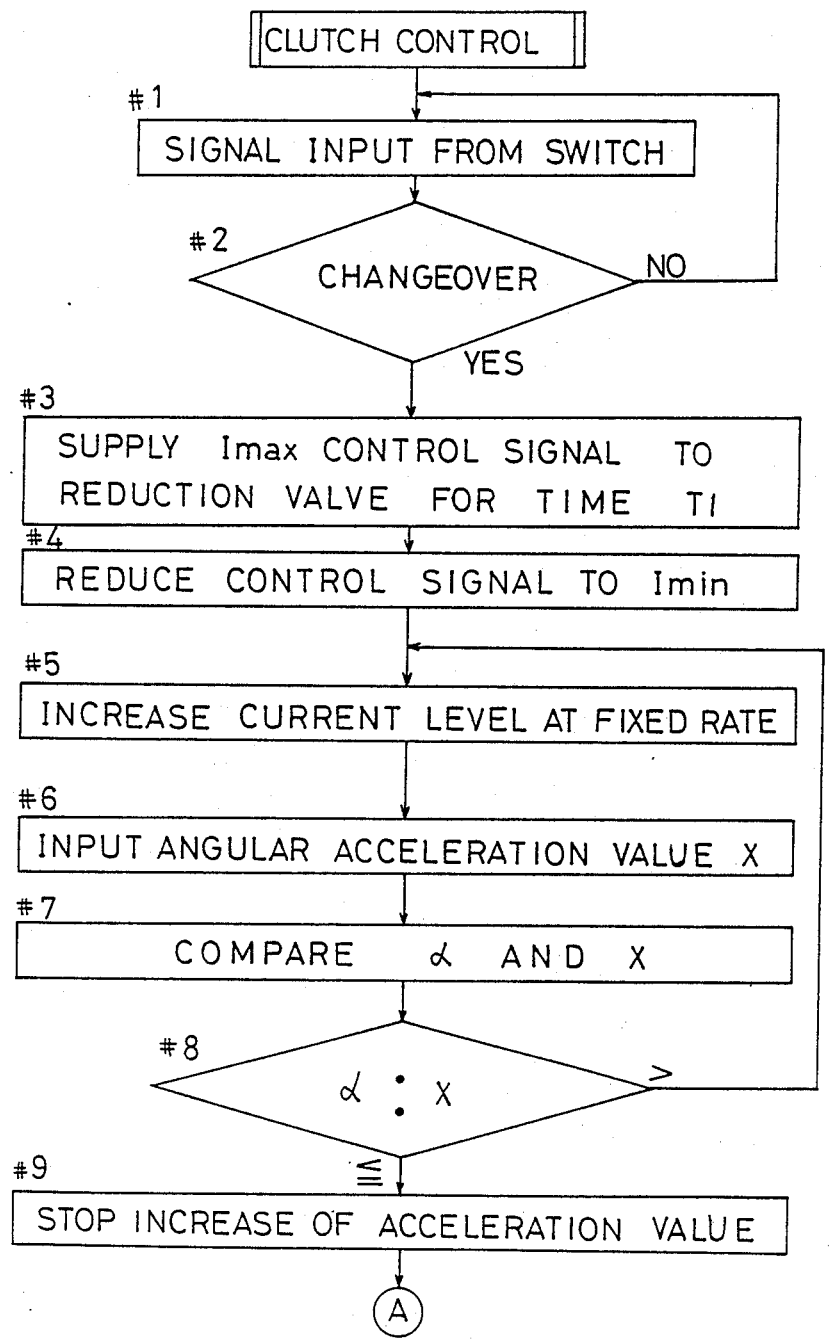
Fig. 3-a

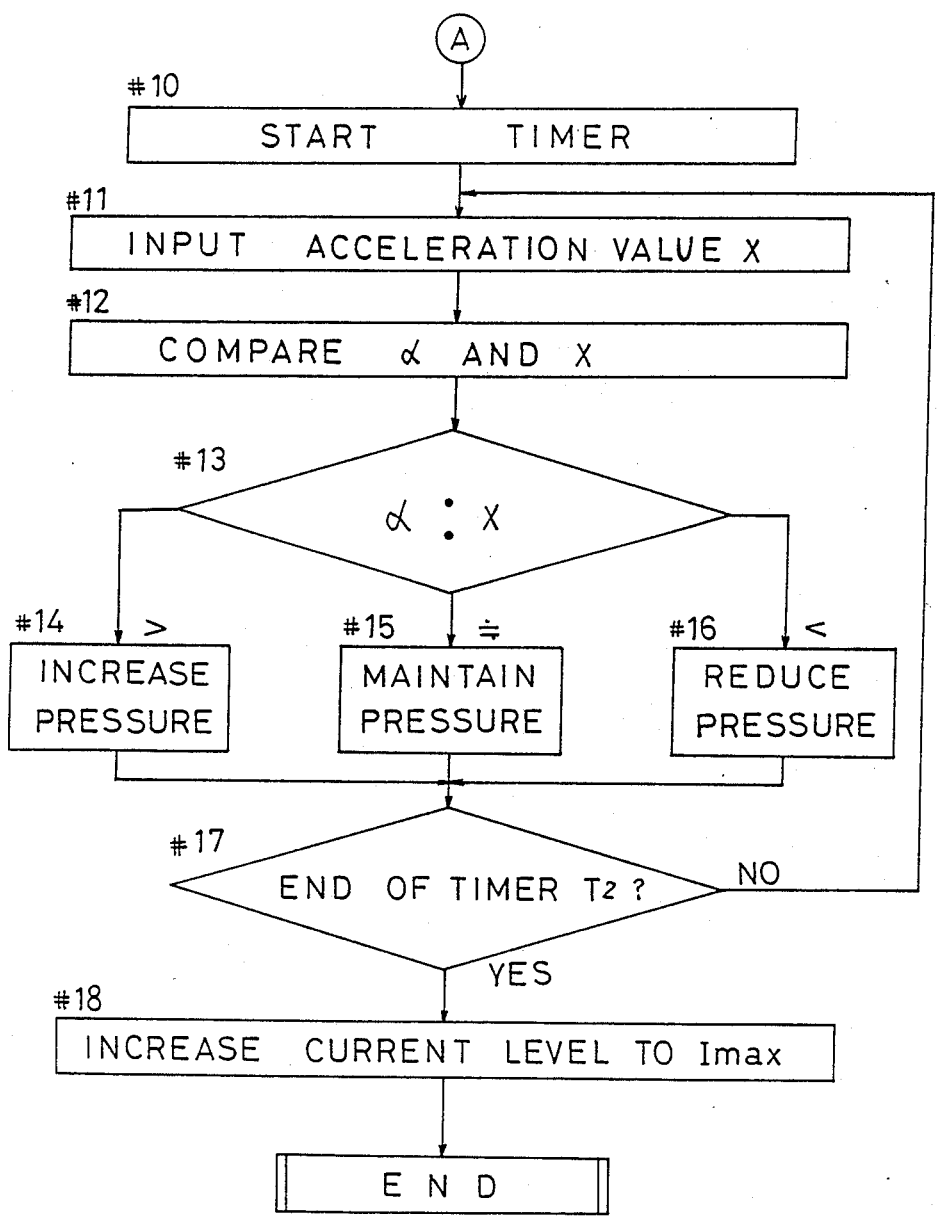
Fig. 3-b

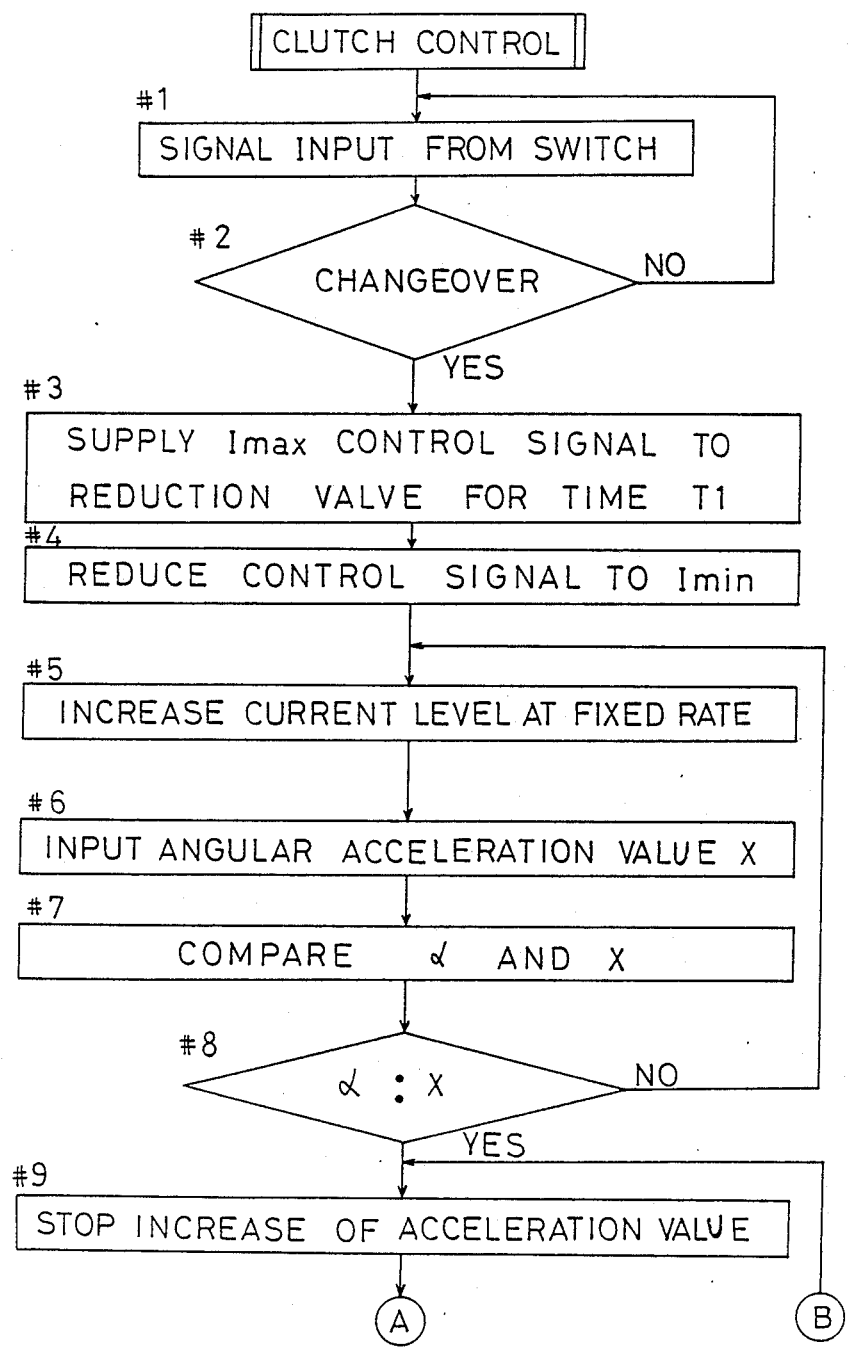
Fig.5-a

Fig. 5-b
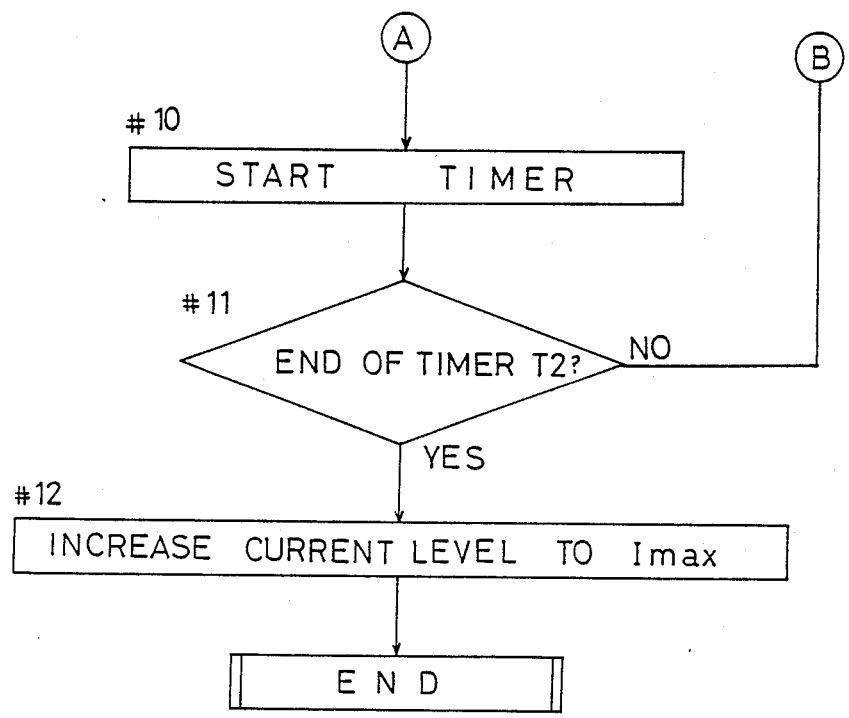

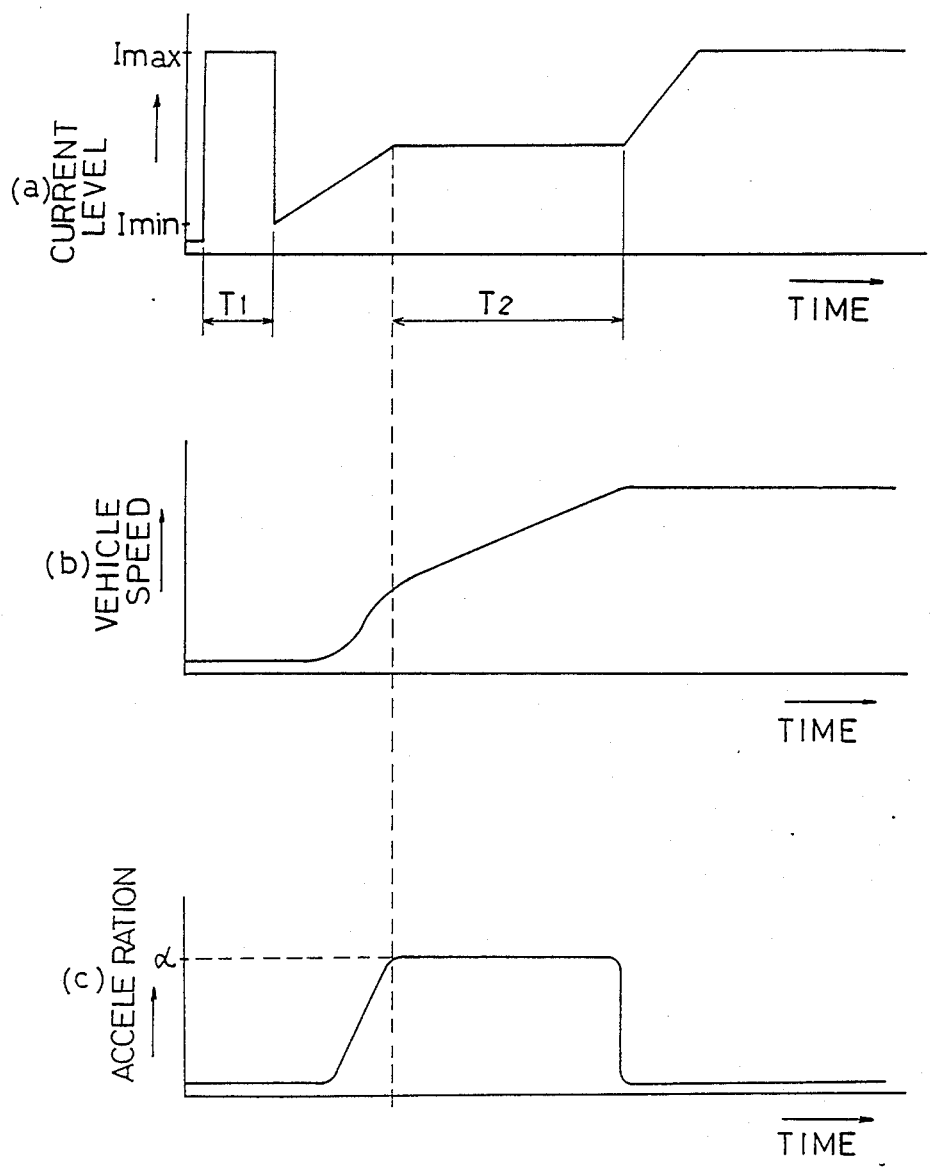

Fig. 7-a
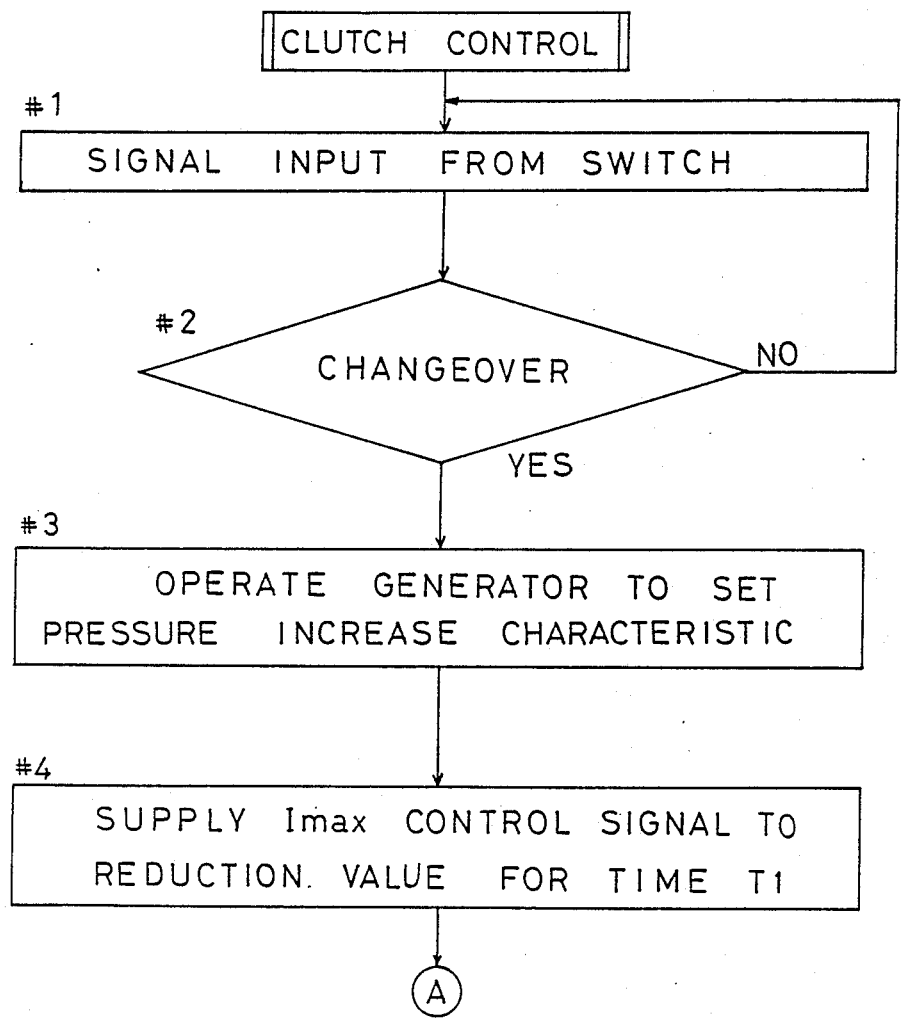

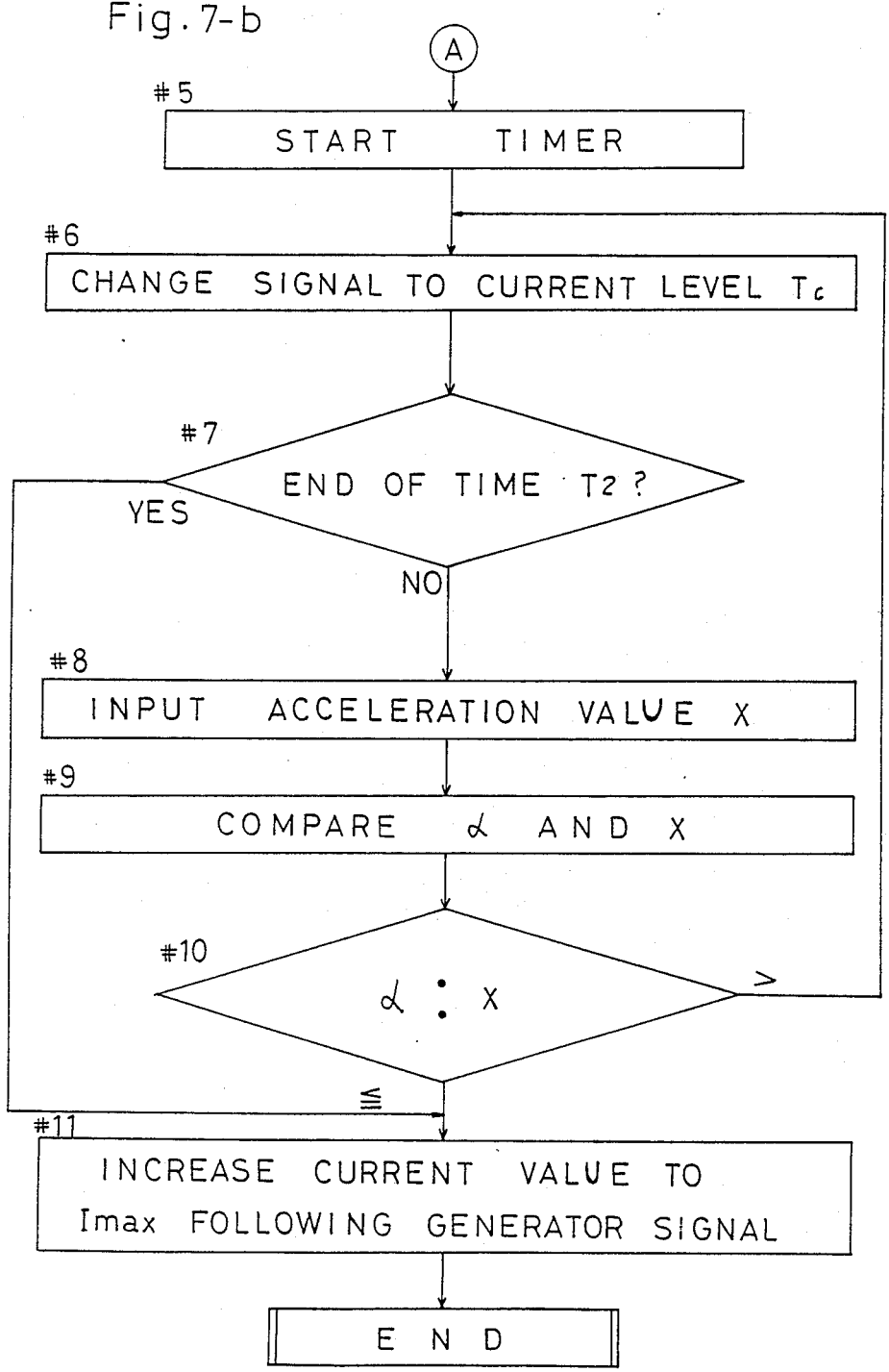
Fig. 7-b

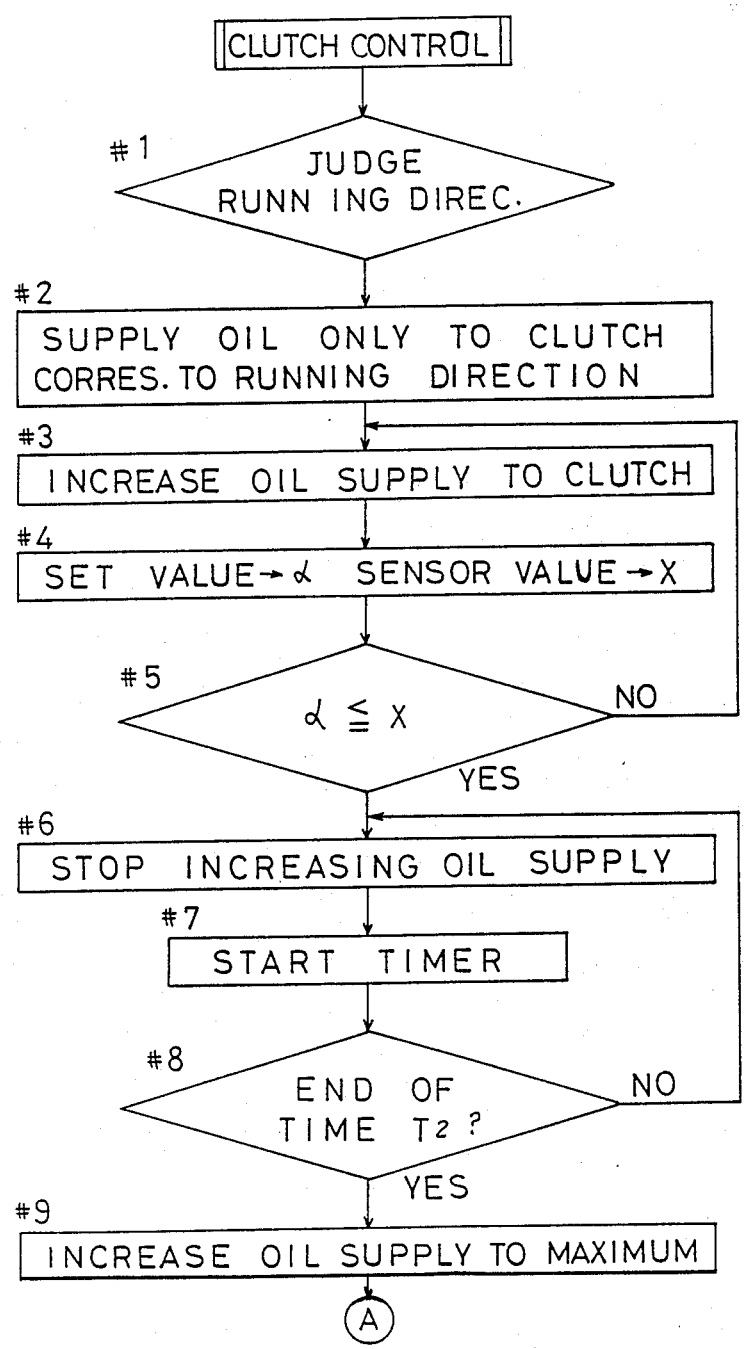
Fig. 9-a

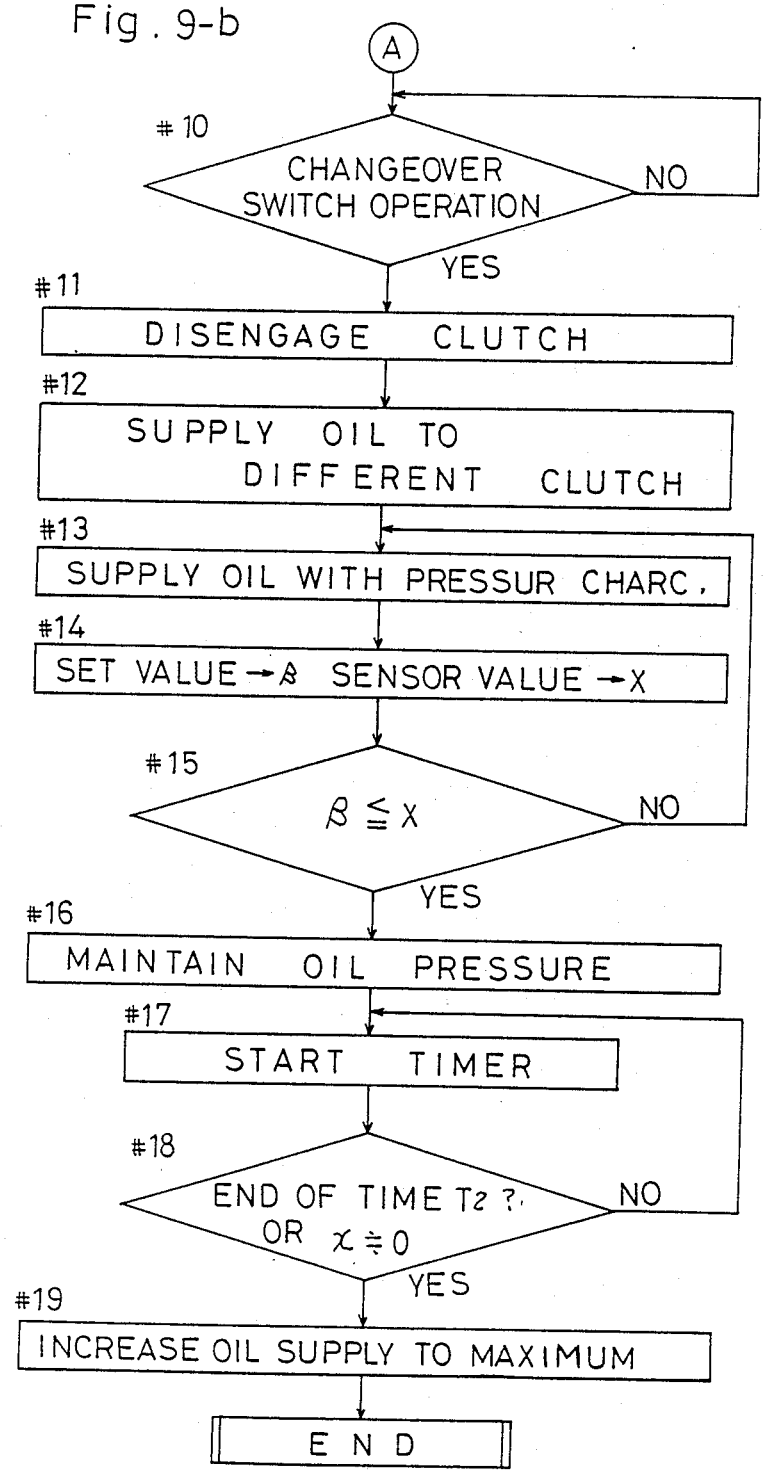
Fig. 9-b

PROPELLING CLUTCH APPARATUS FOR A WORKING VEHICLE

BACKGROUND OF THE INVENTION (1) Field of the Invention

The present invention relates to a propelling clutch apparatus for a working vehicle, and more particularly to a technique of suppressing shocks accompanying an operation of a friction type hydraulic clutch.

(2) Description of the Prior Art

A technique of suppressing shocks accompanying an operation of a hydraulic clutch in a working vehicle is disclosed in Japanese Patent Publication Kokai No. 62-231841, for example. In this prior art construction, the oil pressure applied to the hydraulic clutch is controlled on the basis of acceleration of a propelling line occurring when the hydraulic clutch is being engaged. Thereby the clutch is promptly engageable without producing shocks. This construction includes an acceleration sensor or the like for detecting acceleration of the vehicle. The clutch control is carried out based on feedback of a detection signal from the sensor or the like also when a change speed is effected in a half-clutch state.

According to this prior art construction, when the sensor is subjected to the influence of vehicle pitching when the vehicle runs on an uneven ground, for example, the pressure control effected in response to the signal from the sensor may result in pulsations of the oil pressure applied to the clutch, thereby producing shocks. An extended time may also be required for the clutch to reach an engaged position. Thus the prior construction has room for improvement.

When engaging a friction type hydraulic clutch, pressure oil must be supplied to the clutch rapidly from start of the oil supply till its friction disk begin to contact one another to provide a half-clutch state. After the half-clutch state is secured, it is necessary to accelerate the vehicle gradually while maintaining the half-clutch state for an appropriate time, in order not to impart shocks to the propelling line.

SUMMARY OF THE INVENTION

The object of the present invention is to provide a propelling clutch apparatus in which a hydraulic clutch is engageable effectively with minimum of shocks and without slowing the clutch engaging operation regardless of vehicle running states.

In order to achieve this object, a propelling clutch apparatus for a working vehicle according to the present invention comprises friction type hydraulic clutch means mounted on a propelling line, a valve mechanism for adjusting an oil pressure applied to the hydraulic clutch means, measuring means for detecting angular acceleration of a rotary shaft included in the propelling line, and control means for controlling the hydraulic clutch means in response to a change in a vehicle running state, the control means effecting controls in three stages, namely a first stage including a preliminary step of narrowing spaces between friction disks of the hydraulic clutch means in advance by applying the oil pressure at a predetermined maximum level to the hydraulic clutch means for a predetermined time from receipt of a clutch engaging command, and a subsequent main step of applying the oil pressure with predetermined characteristics, a second stage of maintaining the hydraulic clutch means in a half-clutch state when the angular acceleration in an accelerating direction or a decelerating direction detected by the measuring means reaches a predetermined value, and a third stage of fully engaging the hydraulic clutch means.

According to the above construction, when the control means receives a command for changing a vehicle running state, the control means causes, as a first stage, pressure oil to be supplied at a maximum pressure level to void spaces between the friction disks of the hydraulic clutch means for a predetermined time, thereby rapidly filling the spaces between the friction disks with the pressure oil. Subsequently, the pressure oil is supplied with predetermined characteristics to the hydraulic clutch means. Then the clutch is placed in a half-clutch state to start accelerating the propelling line.

In other words, the construction according to the present invention expedites clutch actuating timing compared with the known construction.

Subsequent to the first stage, angular acceleration of the propelling line constantly input from the measuring means to the control means reaches a predetermined value, whereupon a predetermined control is effected to maintain the hydraulic clutch in the half-clutch state. As distinct from the known construction, the control means receives a signal indicating the acceleration or deceleration of the propelling line, in the form of a signal indicating an angular velocity of a rotary shaft included in the propelling line, which shaft is not influenced by variations in the vehicle posture. This feature eliminates the disadvantage of pressure oil pulsations occurring with the prior art when the vehicle runs on an uneven ground. In the second stage, after the angular acceleration of the propelling line reaches a certain fixed level, a control is effected according to a change speed mode determined by the control means to realize a desirable, smooth acceleration. That is, after the propelling line reaches a certain acceleration level, the hydraulic clutch means is controlled to suppress shocks. The second stage control is followed by a third stage of fully engaging the hydraulic clutch means which is achieved by increasing the oil pressure to the maximum level.

In the above construction, the control system is operable in response to detection results provided by the measuring means associated with a rotary shaft of the propelling line as noted above. There is little possibility of detection errors made by the measuring means even when, for example, the vehicle pitches during a run over an uneven ground. Moreover, acceleration or deceleration is effected by the predetermined control method after the hydraulic clutch is placed in a half-clutch state (i.e. after the angular acceleration reaches the predetermined value), thereby enabling a smooth change speed.

Thus the shocks due to turbulence or the like of the pressure oil supplied to the clutch means do not occur regardless of the situation in which the vehicle is caused to run. Besides, the apparatus according to the present invention allows the hydraulic clutch to be engaged without any retarding effect.

In a preferred embodiment of the invention, the control means effects the second stage control after the angular acceleration reaches the predetermined value, to maintain the angular acceleration substantially at the predetermined value. With this feature, the acceleration of the propelling line does not exceed the predetermined level, which enables a change speed operation to be effected smoothly and as rapidly as is allowed.

The same advantage may be produced where the second stage control is effected after the angular acceleration reaches the predetermined value, to maintain the same half-clutch state, i.e. to maintain the oil pressure at the same level, as when the angular acceleration reaches the predetermined value. In either case the friction type hydraulic clutch means is promptly placed in the half-clutch state, after which the clutch means is controlled to maintain the angular acceleration or oil pressure at the same level. As a result, a change speed operation is effected without external influences. The hydraulic clutch may be engaged without producing shocks and without any retarding effect regardless of the situation in which a vehicle speed is changed.

In a further embodiment of the present invention, the second stage control is effected after the angular acceleration reaches the predetermined value, to increase an internal pressure of the hydraulic clutch means at an increase rate following characteristics predetermined with reference to a point of time of the clutch engaging command. In this case, an oil pressure having predetermined characteristics is applied until a desired half-clutch state is reached (or until desired acceleration is obtained). Consequently, it is possible to place the clutch means in the half-clutch state in a relatively short time, and the angular acceleration of the propelling line does not exceed the predetermined value. After the desired half-clutch state is obtained, this half-clutch state is controllable without any problem since the internal pressure of the hydraulic clutch means is increased following the characteristics which are predetermined with reference to the output timing of a clutch engaging command so that no shocks are imparted to the propelling line. Further, a predetermined time may be set for the hydraulic clutch means to be fully engaged after output of the clutch engaging command.

In this example also, the hydraulic clutch means is rapidly engageable without producing shocks wherever the vehicle may be running, such as an uneven, ground or a paddy field.

The second stage control may be completed upon lapse of a predetermined time following the point of time at which the angular acceleration reaches a fixed value. Alternatively, the acceleration may be effected in a half-clutch state, with the control terminated when the propelling line acceleration is finished and the angular acceleration ceases.

When starting the vehicle on an uphill road, for example, sufficient acceleration may not be achieved with the clutch means maintained in a half-clutch state. It is therefore advantageous to set the time for expediting clutch engagement.

In a further aspect of the present invention, an embodiment is provided to cope with the following situation.

When the running direction is changed while the vehicle is running by inertia, the drive transmitted through the hydraulic clutch means in a half-clutch state is initially consumed for deceleration alone. Therefore, in the known construction noted hereinbefore, the pressure oil supply is continued without accelerating the vehicle. By the time the vehicle speed begins to increase, the hydraulic clutch is almost connected whereby a sudden acceleration is started. It is conceivable that a control having predetermined characteristics is effected only after this acceleration is fed back.

In order to solve this problem, the friction type hydraulic clutch means includes a forward drive clutch and a backward drive clutch, and the valve mechanism includes valves for adjusting oil pressures applied to the forward drive clutch and the backward drive clutch, respectively, wherein the control means is operable, when the oil pressure is applied to one of the forward drive clutch and the backward drive clutch for engaging the same and disengaging the other clutch, to control the valve mechanism to maintain the oil pressure applied to the one clutch after the measuring means outputs a detection signal indicating an absolute value of the angular acceleration having reached the predetermined value.

According to this construction, an oil pressure increasing at a fixed rate is applied when disengaging one of the hydraulic clutches and engaging the other clutch. Next, when this oil supply places the hydraulic clutch in a half-clutch state and the angular acceleration in the reverse direction measured by the measuring means reaches a predetermined value, the oil supply pressure is maintained at the predetermined level.

The fact that angular acceleration at the predetermined value is measured means that the hydraulic clutch has already reached a half-clutch state. After this, change speed is effected sufficiently with the clutch maintained in the half-clutch state simply by supplying the pressure oil under a fixed pressure. Since the value of angular acceleration may be set as desired, its absolute value may be set greater than for the control in starting the vehicle standing still and smaller than for the full engagement of the clutch. It is thereby possible with the construction for enabling a rapid changeover from forward running to backward running, to avoid the hydraulic clutch becoming fully engaged when accelerating the vehicle in the backward direction.

Consequently, when reversing the vehicle moving by inertia, it is possible to start a backward movement smoothly without producing shocks by maintaining the half-clutch state for an appropriate time.

Other features and advantages of the present invention will be apparent from the following description.

BRIEF DESCRIPTION OF THE DRAWINGS

The drawings illustrate a propelling hydraulic clutch apparatus for a working vehicle embodying the present invention, in which:

FIGS. 3a and 3b are a flow chart illustrating an operation of a control unit, FIGS. 5a and 5b are a flow chart illustrating an operation of the control unit according to another embodiment, FIG. 6a is a graph illustrating a control signal applied to the electromagnetic proportional reduction valve at a propelling start according to the embodiment of FIG. 5, FIG. 6b is a graph illustrating vehicle speeds at the propelling start according to the embodiment of FIG. 5, FIG. 6c is a graph illustrating vehicle acceleration at the propelling start according to the embodiment of FIG. 5, FIGS. 7a and 7b are a flow chart illustrating an operation of the control unit according to a further embodiment.

DESCRIPTION OF THE PREFERRED EMBODIMENTS

Embodiments of the present invention will be described hereinafter with reference to the drawings.

Figure 1:
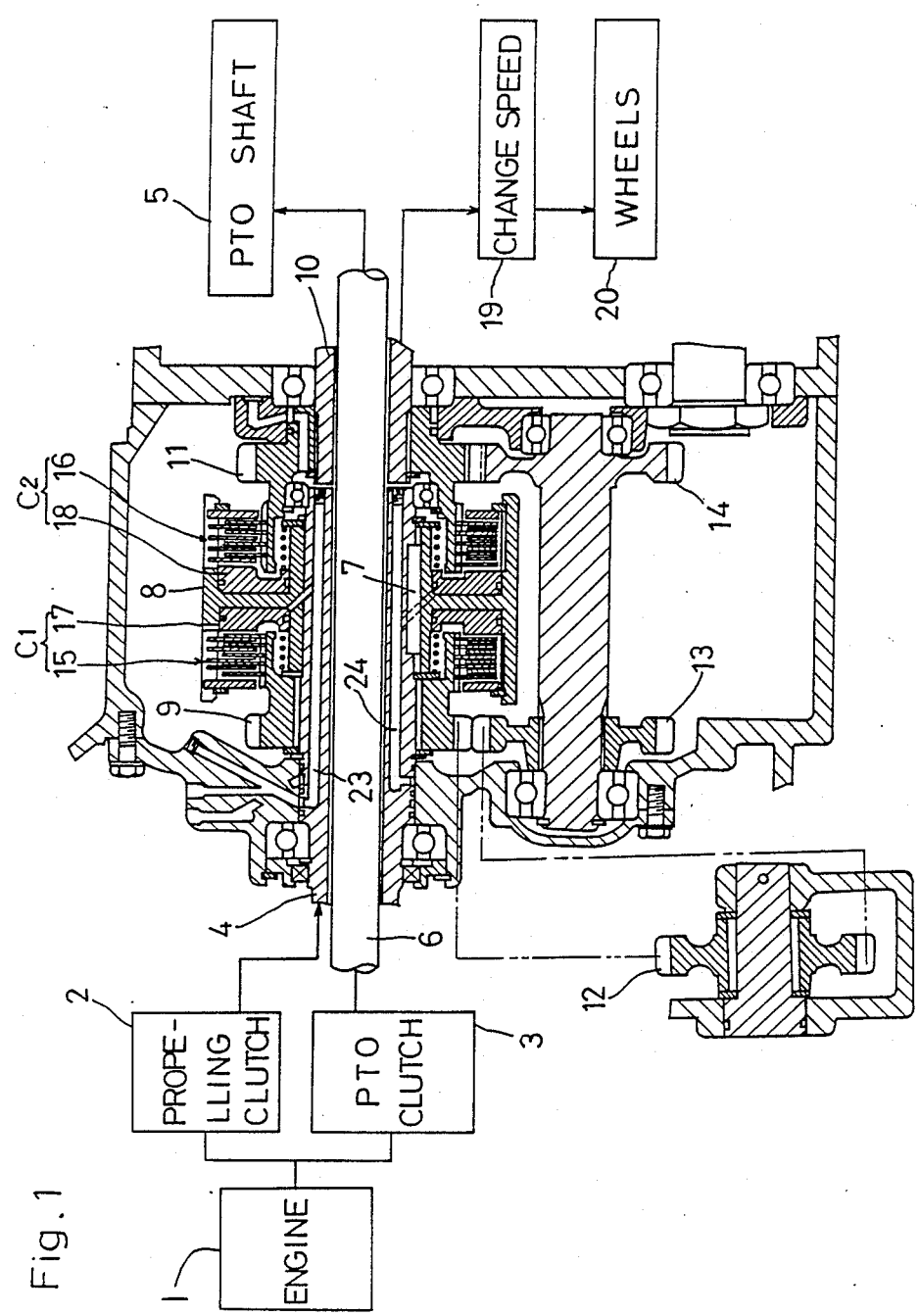
FIG. 1 is a schematic view of a transmission system.

As shown in FIG. 1, drive of an engine 1 is transmitted to a propelling clutch 2 and a power takeoff clutch 3. The propelling clutch 2 transmits the drive to a tubular input shaft 4 of a propelling line. The power takeoff clutch 3 transmits the drive to a transmission shaft 6 mounted in the input shaft 4 for driving a power takeoff shaft 5.

The input shaft 4 carries a clutch case 8 securely mounted thereon through a key 7, and an output gear 9 mounted for rotation relative to the input shaft 4. A tubular intermediate shaft 10 is disposed coaxially with the input shaft 4, which carries an input gear 11 fixed thereto.

A reversing gearing is interposed between the output gear 9 and input gear 11, which gearing includes an idle gear 12 and two gears 13 and 14. The clutch case 8 houses a first hydraulic clutch C1 for transmitting the drive from the input shaft 4 to the output gear 9, and a second hydraulic clutch C2 for transmitting the drive from the input shaft 4 directly to the input gear 11. Each of the hydraulic clutches C1 and C2 includes a plurality of friction disks and a hydraulic piston 17 or 18, and is engageable under oil pressure.

The intermediate shaft 10 transmits the drive through a change speed device 19 to ground wheels 20. This transmission system is equipped on an agricultural tractor, and its propelling line is provided with a control system for controlling the oil pressure applied to the first and second hydraulic clutches C1 and C2 in order to suppress shocks due to the operation of hydraulic clutches C1 and C2.

Figure 2:
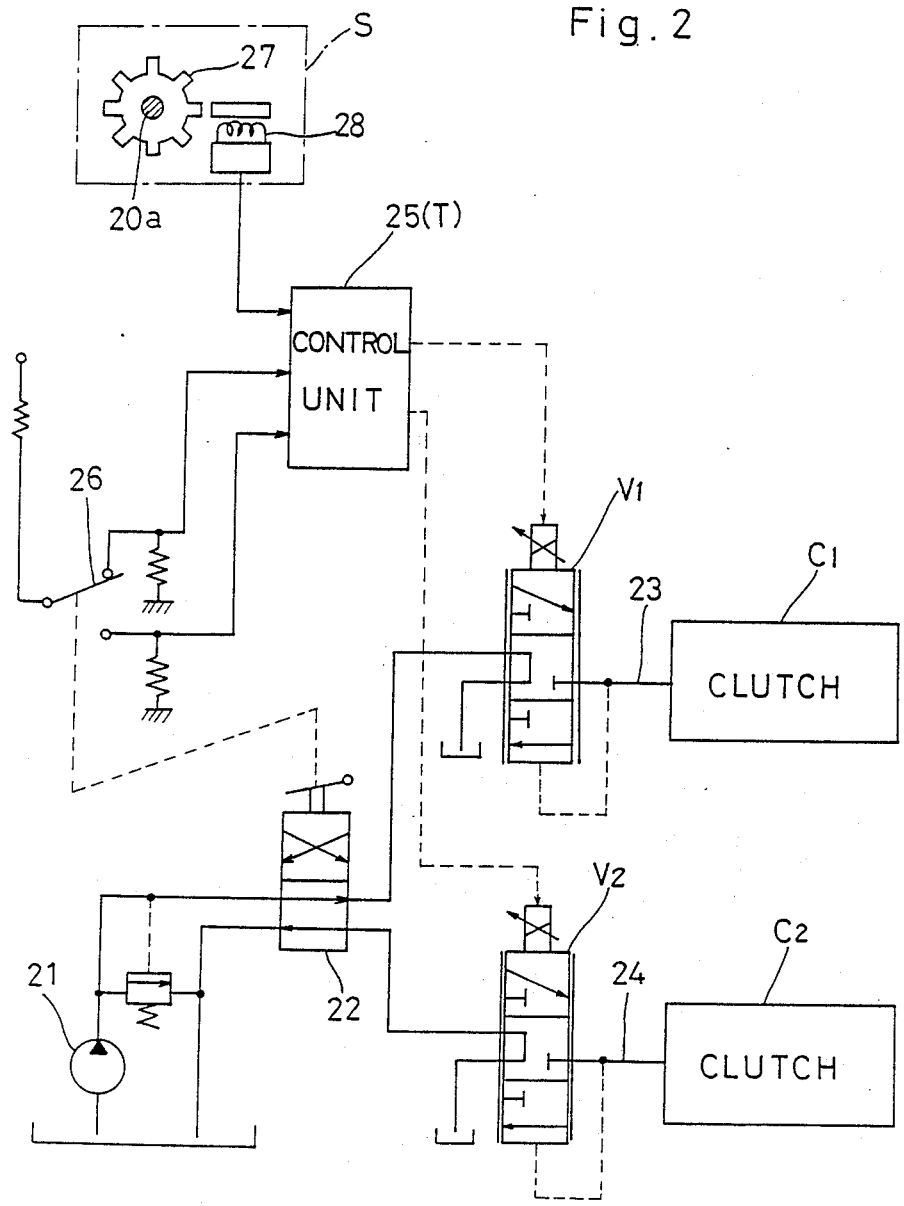
FIG. 2 is a block diagram of a control system for controlling the clutch apparatus.

As shown in FIG. 2, a hydraulic pump 21 supplies pressure oil to a backward and forward drive changeover valve 22 from which oil lines 23 and 24 having electromagnetic proportional reduction valves V1 and V2 extend to the first and second hydraulic clutches C1 and C2, respectively. These reduction valves V1 and V2, which are an example of valve mechanism, are controllable by control signals from a control unit 25 acting as control means T including a microprocessor not shown. The control unit 25 receives signals from a changeover switch 26 which detects operating positions of the valve 22 and from a sensor S (which is an example of measuring means) which detects angular acceleration of the propelling line from rotation of the wheels 20. The control unit 25 is programmed to operate according to the flow chart shown in FIG. 3, such that, when an operation is effected to engage one of the hydraulic clutches C1 and C2, its internal pressure is increased at a predetermined rate, and the internal pressure is maintained under control when and after drive transmission is started through this clutch C1 or C2. The sensor S includes a pickup coil 28 for detecting rotation of a gear 27 mounted on a drive shaft 20a which drives the wheels 20.

The operation of the control unit 25 will now be described referring to the flowchart.

Figure 4:
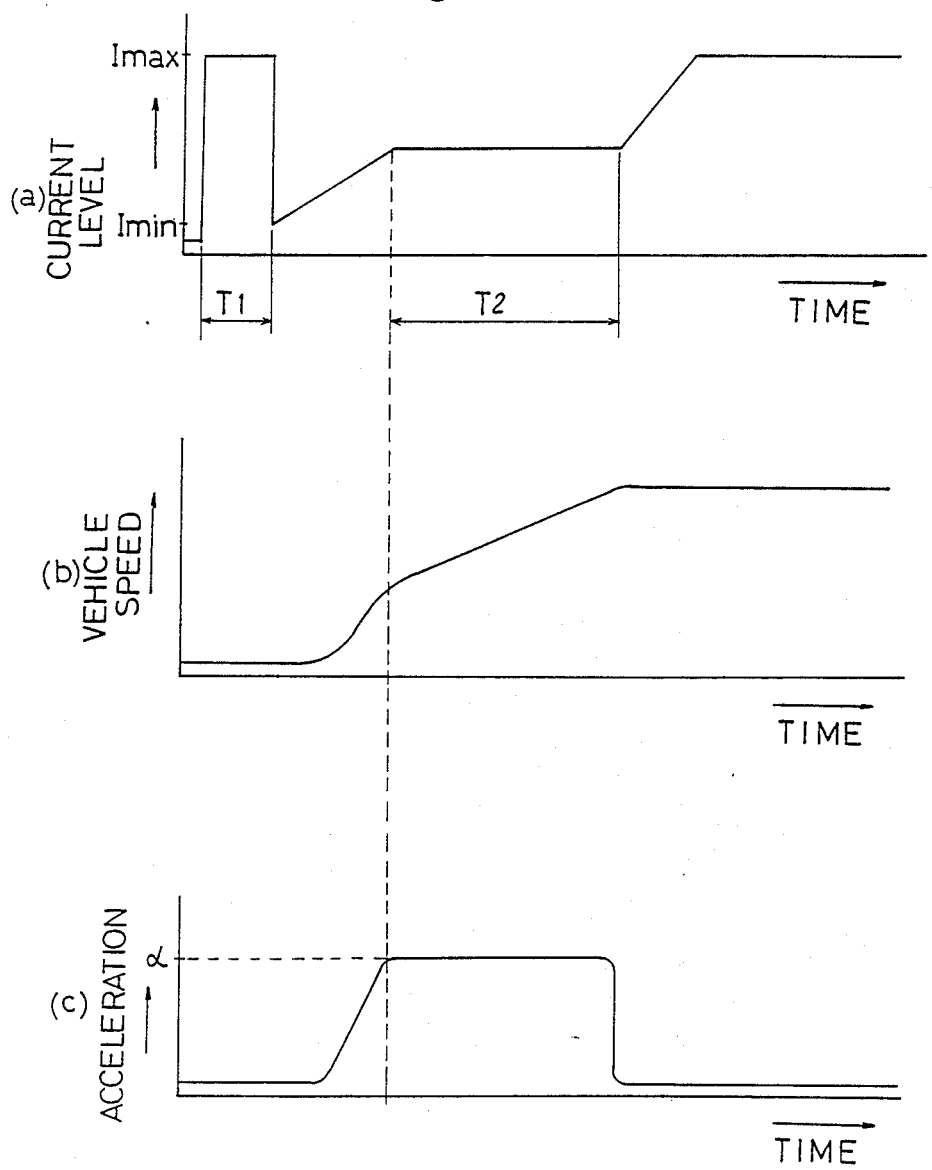
FIG. 4a is a graph illustrating a control signal applied to an electromagnetic proportional reduction valve at a propelling start.
FIG. 4b is a graph illustrating vehicle speeds at the propelling start.
FIG. 4c is a graph illustrating vehicle acceleration at the propelling start.

As a first stage, the control unit 25 detects an operation of valve 22 from the signal received from the changeover switch 26 (steps #1 and #2), and supplies the control signal at a electric current level Imax to one of the reduction valves V1 and V2 to which the pressure oil is to be supplied, for a time T1 as shown in FIG. 4a (step #3). Thereafter the current level of the control signal is reduced to Imin (step #4).

It is to be noted that the oil supply pressure is variable with an increase and decrease in the current level of the control signal supplied to the electromagnetic proportional reduction valves V1 and V2. The control signal is maintained at the high level for the time T1 as noted above, in order to shorten the time required for a hydraulic clutch engaging operation by narrowing spaces between the friction disks of the hydraulic clutches in advance.

Subsequently, the current level of the control signal is increased at a fixed rate (step #5). In this state the control unit 25 receives a value X of angular acceleration from the sensor S (step #6), and compares a predetermined value α and the value X of angular acceleration (steps #7 and #8) thereby to judge whether the hydraulic clutch has reached a half-clutch state to start accelerating the vehicle.

If the value X of angular acceleration is found to exceed the predetermined value α at steps #7 and #8, which indicates vehicle acceleration, the control signal is stopped increasing in the current level (step #9) and a timer is started (step #10). Then the control unit 25 repeats receiving the value X of angular acceleration from the sensor S (step #11) and compares the predetermined value α and the value X (steps #12 and #13). In response to results of the comparison, the pressure of oil supply to the hydraulic clutch C is increased, maintained or decreased to maintain the angular acceleration at the predetermined value α (steps #14, #15 and #16).

After the acceleration control is continued for a predetermined time T2, the current level of the control signal is increased at a fixed rate to Imax as a third stage, for engaging the hydraulic clutch C completely (steps #17 and #18). As a result, the hydraulic clutch C is completely engaged upon completion of the third stage. This completes the clutch engaging operation. In the second stage the acceleration in the half-clutch state is effected only for the time set by the timer, in order not to prolong the time of limited oil supply to the hydraulic clutch when the vehicle is started in an uphill direction and moves downward by gravity.

The operation in the third stage may be carried out after the acceleration is finished in the half-clutch state.

The operations from step #3 through step #18 of the flow chart result in current levels of the control signal and acceleration of the propelling line which describe graphs as shown in FIGS. 4a, 4b and 4c.

Another embodiment of this invention will be described next.

This embodiment is different from the foregoing embodiment in the method of controlling the half-clutch state, which will be described with reference to the flow chart of FIG. 5. As a first stage, as in the foregoing embodiment, the current level of the control signal is increased at the fixed rate (step #5) after the spaces between the friction disks are narrowed. Then the control unit 25 receives a value X of angular acceleration from the sensor S (step #6), and compares the predetermined value α and the value X of angular acceleration (steps #7 and #8) thereby to judge whether the hydraulic clutch has reached a half-clutch state to start accelerating the vehicle. If the vehicle is found accelerated at steps #7 and #8, the control signal is stopped increasing in the current level (step #9). The pressure of oil supply to the hydraulic clutch C is maintained at this current level, and the vehicle is accelerated for the time set by the timer while maintaining the half-clutch state (steps #10 and #11). This pressure oil control can hold the valve mechanism when the angular acceleration reaches a predetermined value. Finally, as in the foregoing embodiment, the hydraulic clutch C is completely engaged by increasing the current level of the control signal at the fixed rate to Imax (step #12).

The operation of control unit 25 according to a further embodiment will be described next with reference to the flow chart of FIG. 7.

In this embodiment the control for the second stage is carried out with certain characteristics.

Figure 8:
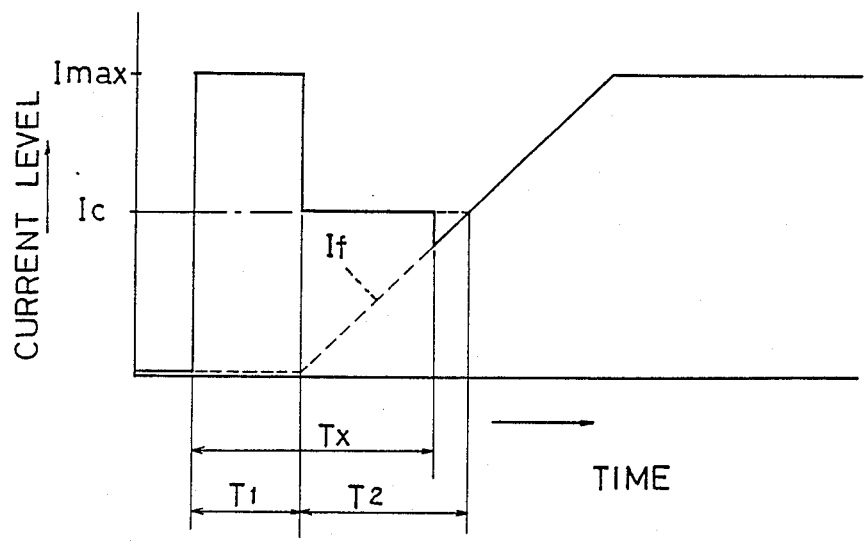
FIG. 8 is a graph illustrating a control signal applied to the electromagnetic proportional reduction valve at a propelling start according to the embodiment of FIG. 7, FIGS. 9a and 9b are a flow chart illustrating an operation of the control unit according to a still further embodiment.

The control unit 25, upon detecting an operation of valve 22 from the signal received from the changeover switch 26 (steps #1 and #2), operates a generator (which is provided by programming) to generate a control signal. If having characteristics as shown in a broken line in FIG. 8 (step #3). Then, as shown in FIG. 8, and as in the foregoing embodiments, the control signal at the current level Imax is supplied to one of the reduction valves V1 and V2 to which the pressure oil is to be supplied, for a time T1 as shown in FIG. 4a (step #4).

Next, a timer (which is provided by programming) is started (step #5), and the current level of the control signal is changed to a level Ic which is set lower than the level Imax (step #6). In parallel with checking made whether the timer indicates the end of time T2 (step #7), the value X of angular acceleration is input from the sensor S (step #8). This value X is compared with the predetermined value α (step #9). When the value X substantially agrees with the value α, the current level of the control signal is increased to Imax following the signal. If from the generator, thereby to engage the hydraulic clutch C completely (steps #10 and #11).

It is so programmed that the current level of the control signal is increased following the signal from the generator when the timer indicates the end of time T2 while the value X of acceleration has not reached the value α (steps #7 and #11). Thus the time for completely engaging the hydraulic clutch C is not unduly prolonged. The clutch engaging operation is controlled in this way. The graph of FIG. 8 illustrates a state where the control signal is switched to the signal. If of the generator after lapse of a time Tx from output of a clutch operating command.

A different operation will be described next with reference to the flow chart of FIG. 9, in which the vehicle is accelerated in an opposite direction to its inertial movement.

When driving the vehicle at a standstill forward, the running direction is judged at step #1. Pressure oil is supplied in a large amount only to the hydraulic clutch corresponding to the running direction (step #2). Thereafter the amount of oil supply to this clutch is increased at the fixed rate (step #3). This operation is effected in the same manner as in the foregoing embodiments as shown in the graph of FIG. 10a.

Then the control unit 25 receives a value X of angular acceleration from the sensor S, and compares the value X with a predetermined value α (steps #4 and #5) thereby to judge whether the hydraulic clutch has reached a half-clutch state to start accelerating the vehicle.

If the vehicle acceleration is detected at steps #4 and #5, the amount of oil supply is stopped increasing (step #6) and the vehicle is accelerated for a time T2 set by the timer while maintaining the half clutch state (steps #7 and #8). Thereafter the amount of oil supply is increased to the maximum level to fully engage the hydraulic clutch (step #9). The operation up to this step is the same as in the foregoing embodiments.

Figure 10:
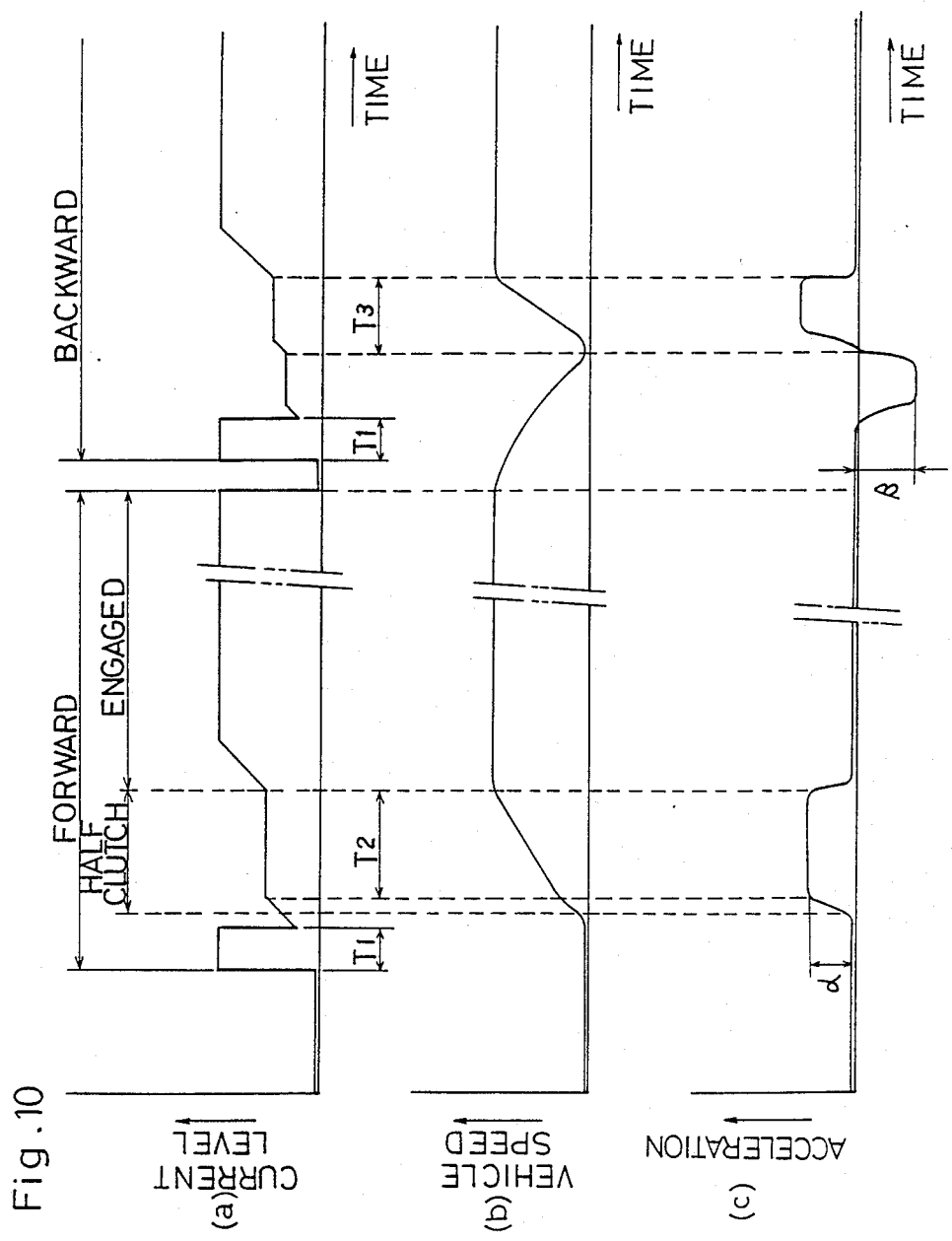
FIG. 10a is a graph illustrating a control signal applied to the electromagnetic proportional reduction valve at a propelling start according to the embodiment of FIG. 9.
FIG. 10b is a graph illustrating vehicle speeds at the propelling start according to the embodiment of FIG. 9.
FIG. 10c is a graph illustrating vehicle acceleration at the propelling start according to the embodiment of FIG. 9.

When the changeover valve 22 is operated after the vehicle starts running forward (step #10), the oil is exhausted from the engaged hydraulic clutch (step #11). Next, as at step #2, a large amount of pressure oil is supplied for the time T1 to the hydraulic clutch to be engaged (step #12). Then the pressure oil is supplied with certain pressure characteristics (step #13) to accelerate the vehicle in the backward direction. When the running direction is changed while the vehicle is moving forward by inertia, the drive transmitted through the backward drive hydraulic clutch in a half-clutch state is initially consumed for deceleration. Therefore, whether or not the backward drive hydraulic clutch is in the half-clutch state must be judged from backward acceleration. This is judged from whether or not angular acceleration X in the negative direction input from the sensor S has reached a predetermined value β as shown in FIG. 10.

The predetermined value β for reversing the vehicle has a greater absolute value than the predetermined value α for driving the vehicle at a standstill (α represents positive acceleration in an accelerating direction, and β represents acceleration in a decelerating direction and takes a negative value). This step is taken since the drive through the clutch is initially used for braking. The value β set higher than the value α allows a rapid changeover from the forward movement by inertia to a backward movement. With the value β the vehicle is accelerated backward while the clutch is maintained in the half-clutch state by a lower oil pressure than when fully engaged. Consequently, the backward acceleration does not produce any shocks as in the prior art.

More particularly, when a change in the vehicle speed is detected at steps #14 and #15, the oil pressure increase is stopped to maintain the half-clutch state (step #16) and the vehicle is accelerated in this state (steps #17 and #18). Thereafter the oil pressure is increased to the maximum level to engage the hydraulic clutch completely (step #19). In this embodiment, the oil pressure is slightly increased when the propelling line reaches the state of accelerating in the reverse direction.

The above operations describe the graphs of FIGS. 10a through 10c, with the absolute value of the current level of the control signal supplied to the electromagnetic proportional reduction valves, the absolute value of the vehicle speed and the acceleration in the accelerating direction expressed in the positive, and the acceleration in the decelerating direction expressed in the negative.

Besides the foregoing embodiments, the present invention is applicable to a multistep change speed transmission system or to a transport vehicle. The control unit may comprise hardware consisting of a combination of comparators, logic gates and the like. The friction clutches comprise hydraulic clutches in the described embodiments but may comprise other types of friction clutches.

The measuring means S may comprise a photosensor, a generator or various other types.

The control characteristics for setting the pressure increase rate may comprise the curved line or other non-linear type instead of the described linear type.

The valve mechanism may be varied in many ways other than the electromagnetic proportional reduction valves.

What is claimed is:

1. A propelling clutch apparatus for a working vehicle comprising:
   friction type hydraulic clutch means (C) mounted on a propelling line;
   a valve mechanism (V) for adjusting an oil pressure applied to said hydraulic clutch means (C);
   measuring means (S) for detecting angular acceleration of a rotary shaft (20a) included in the propelling line; and
   control means (T) for controlling said hydraulic clutch means (C) in response to a change in a vehicle running state, said control means (T) including;
   first control means (Ta) providing a first stage including a preliminary step of narrowing spaces between friction disks of said hydraulic clutch means (C) in advance by applying the oil pressure at a predetermined maximum level (Imax) to said hydraulic clutch means (C) for a predetermined time (T1) from receipt of a clutch engaging command, and a subsequent main step of applying the oil pressure with predetermined characteristics,
   second control means (Tb) providing a second stage of maintaining said hydraulic clutch means (C) in a half-clutch state when the angular acceleration in an accelerating direction or a decelerating direction detected by said measuring means (S) reaches a predetermined value, and
   third control means (Tc) providing a third stage of fully engaging said hydraulic clutch means (C).

2. A propelling clutch apparatus as claimed in claim 1, wherein said second control means (Tb) effects the second stage control after the angular acceleration reaches said predetermined value, to maintain the angular acceleration substantially at said predetermined value.

3. A propelling clutch apparatus as claimed in claim 2, wherein said second said second control means (Tb) terminates said second stage of maintaining the angular acceleration at the predetermined value when the angular acceleration ceases as a result of a running state becoming steady.

4. A propelling clutch apparatus as claimed in claim 1, wherein said second control means (Tb) effects the second stage control after the angular acceleration reaches said predetermined value, to maintain the oil pressure at the same level as when the angular acceleration reaches said predetermined value.

5. A propelling clutch apparatus as claimed in claim 4, wherein said second control means (Tb) maintains the oil pressure at the predetermined level for a time (T2) which is predeterminable.

6. A propelling clutch apparatus as claimed in claim 4, wherein said second control means (Tb) terminates said second stage of maintaining the oil pressure at the predetermined value when the angular acceleration ceases as a result of a running state becoming steady.

7. A propelling clutch apparatus as claimed in claim 1, wherein said second control means (Tb) effects the second stage control after the angular acceleration reaches said predetermined value, to increase an internal pressure of said hydraulic clutch means (C) at an increase rate following characteristics predetermined with reference to a point of time of the clutch engaging command.

8. A propelling clutch apparatus as claimed in claim 2, wherein said second control means (Tb) maintains the angular acceleration at the predetermined value for a time (T2) which is predeterminable.

9. A propelling clutch apparatus as claimed in claim 1, wherein said first control means (Ta) in said main step in the first increases the oil pressure at a predetermined fixed rate after reducing the oil pressure to a predetermined minimum level (Imin).

10. A propelling clutch apparatus as claimed in claim 1, wherein said first control means (Ta) in said main step in the first stage reduces the oil pressure to a predetermined fixed level (Ic) and thereafter maintains the oil pressure at the predetermined fixed level (Ic).

11. A propelling clutch apparatus as claimed in claim 1, wherein said valve mechanism (V) comprises electromagnetic proportional reduction valves.

12. A propelling clutch apparatus as claimed in claim 1, wherein said measuring means (S) includes a pickup coil (28) for detecting rotation of a gear (27) mounted on a drive shaft (20a) of wheels (20).

13. A propelling clutch apparatus as claimed in claim 1, wherein said friction type hydraulic clutch means (C) includes a forward drive clutch (C1) and a backward drive clutch (C2), said valve mechanism (V) including valves (V1, V2) for adjusting oil pressures applied to said forward drive clutch (C1) and said backward drive clutch (C2), respectively, and wherein said control means (T) is operable, when the oil pressure is applied to one of said forward drive clutch (C1) and said backward drive clutch (C2) for engaging the same and disengaging the other clutch (C1 or C2), to control said valve mechanism (V) to maintain the oil pressure applied to said one clutch after said measuring means (S) outputs a detection signal indicating an absolute value of said angular acceleration having reached the predetermined value.

14. A propelling clutch apparatus as claimed in claim 13, wherein, in relation to reversal of a running direction, said angular acceleration has a greater absolute value which limits the angular acceleration, for changing from forward running to backward running than for changing from a standstill to a running state.

15. A propelling clutch apparatus for a working vehicle comprising:

friction clutch means (C) mounted on a propelling line;

a mechanism (V) for adjusting an operating oil pressure between friction disks of said friction clutch means (C);

measuring means (S) for detecting angular acceleration of a rotary shaft (20a) included in the propelling line; and control means (T) for controlling said hydraulic clutch means (C) in response to a change in a vehicle running state, said control means (T) including;

first control means (Ta) providing a first stage including a preliminary step of narrowing spaces between friction disks of said friction or hydraulic clutch means (C) in advance by applying the oil pressure at a predetermined maximum level (Imax) to said friction or hydraulic clutch means (C) for a predetermined time (T1) from receipt of a clutch engaging command, and a subsequent main step of applying the oil pressure with predetermined characteristics, second control means (Tb) providing a second stage of maintaining said friction or hydraulic clutch means (C) in a half-clutch state when the angular acceleration in an accelerating direction or a decelerating direction detected by said measuring means (S) reaches a predetermined value, and third control means (Tc) providing a third stage of fully engaging said clutch means (C).

* * * * *